(12) United States Patent
Koch et al.

(10) Patent No.: US 10,413,879 B2
(45) Date of Patent: Sep. 17, 2019

(54) TYPE OF BURNING DEVICE FOR PRODUCING GAS MIXTURES

(71) Applicant: SGL CARBON SE, Wiesbaden (DE)

(72) Inventors: Christoph Koch, Meitingen (DE); Arash Rashidi, Meitingen (DE); Christian Bienhuels, Meitingen (DE); Birgit Skarke, Meitingen (DE)

(73) Assignee: SGL CARBON SE, Wiesbaden (DE)

( * ) Notice: Subject to any disclaimer, the term of this patent is extended or adjusted under 35 U.S.C. 154(b) by 0 days.

(21) Appl. No.: 15/765,084

(22) PCT Filed: Oct. 4, 2016

(86) PCT No.: PCT/EP2016/073695
§ 371 (c)(1),
(2) Date: Mar. 30, 2018

(87) PCT Pub. No.: WO2017/055639
PCT Pub. Date: Apr. 6, 2017

(65) Prior Publication Data
US 2018/0280919 A1     Oct. 4, 2018

Related U.S. Application Data

(60) Provisional application No. 62/235,838, filed on Oct. 1, 2015.

(51) Int. Cl.
*B01J 19/00*     (2006.01)
*B01J 19/02*     (2006.01)
(Continued)

(52) U.S. Cl.
CPC .......... *B01J 19/02* (2013.01); *B01J 19/2415* (2013.01); *C01B 7/00* (2013.01); *C01B 7/012* (2013.01);
(Continued)

(58) Field of Classification Search
CPC ... B01J 19/00; B01J 19/02; B01J 19/24; B01J 19/2415; B01J 2208/00–00017; B01J 2208/00504; B01J 2219/00049; B01J 2219/00051; B01J 2219/00157; B01J 2219/02; B01J 2219/0204; B01J 2219/025; B01J 2219/0254; B01J 2219/0263;
(Continued)

(56) References Cited

U.S. PATENT DOCUMENTS 2,220,304 A   11/1970   Tracy
3,988,427 A   10/1976   Bossier, III et al.
(Continued)

FOREIGN PATENT DOCUMENTS

BE    846627 A      3/1977
DE    2916252 A1   10/1980
(Continued)

OTHER PUBLICATIONS

International Search Report dated Jan. 30, 2017 of corresponding International application No. PCT/EP2016/073695; 7 pgs.
(Continued)

*Primary Examiner* — Natasha E Young
(74) *Attorney, Agent, or Firm* — Maier & Maier, PLLC

(57) ABSTRACT

A new type of burning device for producing hydrohalogen compounds.

15 Claims, 5 Drawing Sheets

(51) Int. Cl.
  *B01J 19/24* (2006.01)
  *C01B 7/00* (2006.01)
  *C01B 7/01* (2006.01)
  *C01B 7/09* (2006.01)
  *F23D 14/24* (2006.01)
  *F23D 14/62* (2006.01)
(52) U.S. Cl.
  CPC .............. *C01B 7/093* (2013.01); *F23D 14/24* (2013.01); *F23D 14/62* (2013.01); *B01J 2208/00504* (2013.01); *B01J 2219/00157* (2013.01); *B01J 2219/0254* (2013.01); *B01J 2219/0263* (2013.01); *B01J 2219/0272* (2013.01); *B01J 2219/0281* (2013.01); *B01J 2219/0295* (2013.01)
(58) Field of Classification Search
  CPC ........ B01J 2219/0272; B01J 2219/0277; B01J 2219/0281; B01J 2219/0295; C01B 7/00–012; C01B 7/09; C01B 7/093; F23D 14/00; F23D 14/20–24; F23D 14/46; F23D 14/62
  See application file for complete search history.

(56) References Cited

U.S. PATENT DOCUMENTS

| | | | |
|---|---|---|---|
| 4,910,008 A | 3/1990 | Prudhon | |
| 5,257,927 A | 11/1993 | Lang | |
| 5,492,649 A | 2/1996 | Christensen | |
| 6,511,312 B2* | 1/2003 | Primdahl | F23C 7/004 239/403 |
| 8,096,804 B2* | 1/2012 | Boyer | F23C 3/006 431/207 |
| 2001/0041161 A1 | 11/2001 | Frances et al. | |
| 2002/0086257 A1 | 7/2002 | Primdahl | |
| 2013/0266485 A1* | 10/2013 | Franz | C01B 7/012 422/119 |

FOREIGN PATENT DOCUMENTS

| | | |
|---|---|---|
| EP | 0497712 A1 | 8/1992 |
| EP | 0997433 A1 | 5/2000 |
| EP | 1531147 A1 | 5/2005 |
| JP | S53-63300 A | 6/1978 |
| JP | H06-91157 A | 4/1994 |
| JP | H06-505554 A | 6/1994 |
| JP | H11-236201 A | 8/1999 |
| JP | 2002-235908 A | 8/2002 |
| RU | 2223907 C2 | 2/2004 |

OTHER PUBLICATIONS

M.I. Levinsky et al.; "Hydrogen chloride and hydrochloric acid"; M. Chemistry; 1985; p. 31; col. 2 last paragraph; including partial machine-generated English language translation; 4 pages.

* cited by examiner

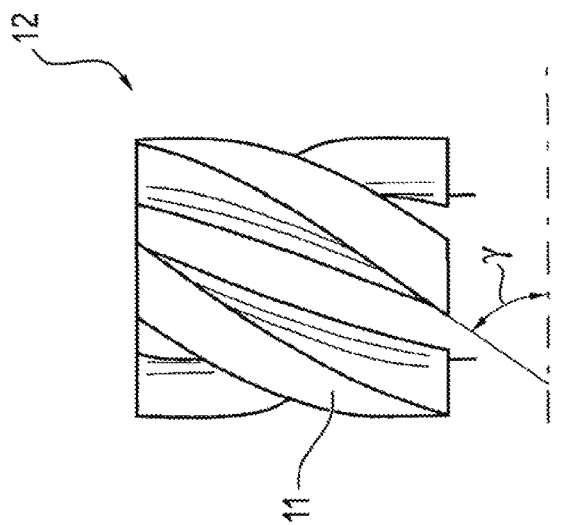
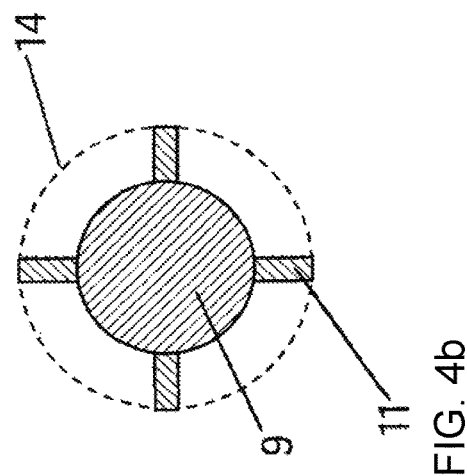
FIG. 4a
FIG. 4b

TYPE OF BURNING DEVICE FOR PRODUCING GAS MIXTURES

This application is a national stage application claiming priority to PCT/EP2016/073695, now WO2017/055639, filed on Oct. 4, 2016, which claims priority to U.S. Provisional Patent Application Ser. No. 62/235,838, filed Oct. 1, 2015.

FIELD

The present invention relates to a new type of burning device for producing hydrogen compounds of halogens.

BACKGROUND

Hydrochloric acid, also referred to as hydrogen chloride, is used and processed in the chemical industry in many different ways. Typical fields of application are chloralkali electrolysis or the production of vinyl chloride. Hydrochloric acid is often obtained as a by-product, for example in the chlorination of organic compounds. However, the demand for hydrochloric acid cannot be met in this way.

Special corrosion-resistant hydrogen chloride synthesis facilities are therefore used in the industry for synthetic production. In these facilities, chlorine gas and hydrogen gas react at temperatures of up to 2500° C. so as to form hydrogen chloride gas. The combustion reaction occurs in the combustion chamber. The burner, through which the feed gases flow into the combustion chamber, consists of two concentric tubes, chlorine gas being supplied via the inner tube and hydrogen gas via the outer tube. The combustion reaction occurs in the flame above the burner. In order to achieve as high a conversion of chlorine as possible, an excess of hydrogen of from 5 to 15% is usually set. The reaction is completed at the outlet of the combustion chamber and the hydrogen chloride gas formed flows through the absorption part of the synthesis means, where it is absorbed to form hydrochloric acid (U.S. Pat. No. 9,415,364).

One problem in the production of hydrogen chloride is that of incomplete combustion which leads to a higher proportion of free chlorine in the product acid. As a result of the reactant gases being insufficiently mixed, the geometry of the flame is very long and narrow, which in turn requires a large combustion chamber. This has a negative impact on the level of costs.

SUMMARY

The object of the invention is therefore to provide a burning device for producing hydrogen halide, by means of which device improved mixing of halogen gas and hydrogen gas is achieved and the free halogen content in the product is reduced.

This object is achieved by a burning device for producing hydrogen halide, comprising at least two concentrically arranged combustion tubes, wherein a swirl generator is arranged in the inner combustion tube.

In the context of the invention, hydrogen halide is considered to be hydrogen bromide and hydrogen chloride, hydrogen chloride preferably being used. Where chlorine gas or hydrogen chloride is mentioned in the following, the same also applies for bromine gas or hydrogen bromide.

In the context of the invention, concentrically arranged combustion tubes are understood to mean that an inner combustion tube is arranged in an outer combustion tube, the inner combustion tube being arranged in the centre of the outer combustion tube (see FIG. 3). The inner combustion tube is used as a transport tube for the chlorine gas, whereas the hydrogen gas is supplied via the gap between the inner and outer combustion tubes. In the context of this invention, a swirl generator is understood to mean a component that causes the chlorine gas to flow in a swirling motion. As a result of the turbulence resulting therefrom, the interface between chlorine and hydrogen is also enlarged, which means that improved mixing is achieved and the time necessary for retaining the gases in the combustion chamber is thus shortened, as a result of which a shorter and more stable flame is obtained by comparison with a burner that does not have a swirl generator. The shorter flame allows smaller synthesis facilities to be used and the more stable flame results in a continuous process. How much the flame shortens and how stable the flame is depends on both the dimensions and the capacity of the synthesis unit. By using a swirl generator in the inner combustion tube and by axially discharging the hydrogen out of the outer combustion tube, improved mixing of the reactant gases is achieved and a recirculation zone is formed near to the burner outlet. In the recirculation zone, hot gas is drawn back toward the burning device outlet, as a result of which the gas discharging from the burning device is preheated. This entails a higher conversion, i.e. the free chlorine content is reduced and the flame is stabilized.

The swirl generator is located in the feed stream of the chlorine gas, since the mass flow rate of the chlorine gas is 20 times greater than the mass flow rate of the hydrogen gas. The swirl effect can thus be better utilized. Mass flow rate is understood to mean the mass that moves through a cross section per unit of time. The length, shape, stability and intensity of the flame can be adjusted by the swirl generator.

Advantageously, the swirl generator is glued, jammed or attached by means of a spindle into the inner combustion tube.

The outer combustion tube and inner combustion tube are advantageously closed off at the same height. As a result, the gases are first mixed immediately upon being discharged out of the burning device. This is therefore a non-premixed combustion.

The outer and the inner combustion tubes are advantageously constructed as one piece or from a plurality of segments.

The outer combustion tube, the inner combustion tube and the swirl generator are advantageously made of corrosion-resistant material, preferably selected from the group consisting of graphite, synthetic graphite, graphite impregnated with synthetic resin, silicon carbide, graphite coated with silicon carbide, silica glass, aluminum oxide or any mixtures thereof. The outer combustion tube, the inner combustion tube and the swirl generator are particularly preferably made of graphite, synthetic graphite, graphite impregnated with synthetic resin or any mixtures thereof, most preferably made of graphite, synthetic graphite, graphite impregnated with phenolic resin or any mixtures thereof.

The swirl generator is preferably from 0.5 to 2 times the length, preferably from 1 to 1.5 times the length, of the inner diameter of the inner combustion tube. In the context of the invention, the inner diameter of the inner combustion tube ($D^I_{Innen}$) is understood to mean the diameter of the inner combustion tube, i.e. the diameter without the tube wall. The diameter of the inner combustion tube is understood to mean the outer diameter ($D^A_{Innen}$) of the inner combustion tube (see FIG. 3). If the length is smaller than 0.5 times the inner diameter of the inner combustion tube, it is not sufficiently long to swirl the supplied chlorine gas. The positive effects of the swirl generator therefore do not occur. If the length is greater than 2 times the inner diameter of the inner combustion tube, the supplied chlorine gas is swirled twice, the double swirling not resulting in further improvements to the positive effects of the swirl generator.

The swirl generator advantageously has an outer diameter of from 30 mm to 300 mm, preferably from 30 to 280 mm.

In the context of the invention, the outer diameter of the swirl generator is understood to mean the diameter consisting of the core of the swirl generator and the guide vanes (see FIG. 4b). If the swirl generator has a smaller outer diameter, the speed of the chlorine gas is greatly increased, as a result of which the mixing time is reduced and the conversion therefore also reduced. If the outer diameter is greater, the speed of the chlorine gas decreases, the generated turbulence is less pronounced, and thus there is also less mixing of hydrogen gas and chlorine gas, the conversion is therefore also lower, and thus the free chlorine content in the product is higher.

The ratio of the core diameter to the outer diameter of the swirl generator is advantageously from 1:2.5 to 1:1.5, preferably from 1:2 to 1:1.5. In the context of the invention, the core diameter is understood to mean the diameter of the swirl generator without the guide vanes. If the ratio of the core diameter to the outer diameter is less than 1:2.5, the speed of the chlorine gas decreases, as a result of which the generated turbulence is less pronounced and thus there is also less mixing of hydrogen gas and chlorine gas, the conversion is therefore also lower, and thus the free chlorine content in the product is higher.

If the ratio of the core diameter to the outer diameter is greater than 1:1.5, the speed of the chlorine gas becomes very high, as a result of which the mixing time of hydrogen gas and chlorine gas is reduced and the conversion is thereby also reduced, and thus the free chlorine content in the product increases.

In an advantageous embodiment, the swirl generator comprises at least two guide vanes, preferably at least 4 guide vanes. If there are less than two guide vanes, the mass flow rate per subchannel is too high, which causes an inhomogeneous flame. Moreover, there is less mixing of hydrogen gas and chlorine gas.

For hydrogen gas and chlorine gas to be well mixed, it is advantageous for the guide vanes to be symmetrically distributed around the core of the swirl generator. In plan view, the guide vanes are advantageously rectangular or trapezoidal.

In a further advantageous embodiment, the free cross-sectional area, based on the total cross-sectional area of the swirl generator that is subject to flow, is from 15 to 75%, preferably from 20 to 65%. If the free cross-sectional area is smaller than 15% based on the total cross-sectional area of the swirl generator that is subject to flow, the speed of the chlorine gas becomes too high, as a result of which the conversion is reduced. If the cross-sectional area is higher than 75% based on the total cross-sectional area of the swirl generator that is subject to flow, the speed of the chlorine gas becomes too low, as a result of which the conversion is reduced. In the context of the invention, the free cross-sectional area denotes the total of the free surface areas between the guide vanes, i.e. the region through which the chlorine gas flows. The total surface area of the swirl generator that is subject to flow is understood to mean the total cross-sectional area of the swirl generator.

In a further advantageous embodiment, the guide vanes extend in a spiral shape along the longitudinal axis.

In the context of this invention, the longitudinal axis is understood to mean the axis which extends in the direction of the chlorine gas flow.

The pitch of the guide vanes is advantageously from 1 to 2, preferably 1. The pitch is understood to mean the number of revolutions of a guide vane around the core of the swirl generator. If the pitch is greater than 2, the chlorine gas flow is swirled more than twice, and no further improvement to the mixing of hydrogen gas and chlorine gas is achieved.

The guide vanes advantageously have an average angle of incidence of from 35° to 85°, preferably from 40° to 75°, most preferably 60°. In the context of this invention, the average angle of incidence is understood to mean the angle between the direction of the inflowing fluid and the surface of the guide vanes (see FIG. 4b).

The average angle of incidence has a significant influence on the speed distribution of the chlorine gas and on the return flow of the chlorine gas, which leads to the flame being stabilized. If the average angle of incidence is smaller than 35°, the chlorine gas flow is vigorously swirled and the flame becomes very wide, which leads to the temperature of the combustion chamber wall increasing. If the average angle of incidence is greater than 75°, the chlorine gas is not swirled.

The supplied hydrogen gas advantageously is discharged axially out of the outer combustion tube. The axial discharge of the hydrogen gas out of the outer combustion tube improves the mixing of hydrogen gas and chlorine gas, as the chlorine gas supplied from the inner combustion tube is pushed by the hydrogen gas that is axially discharged from the gap between the outer and inner combustion tubes, as a result of which there is increased mixing of hydrogen gas and chlorine gas, and as a result the conversion is increased and thus the free chlorine content in the product is reduced.

In a further advantageous embodiment, a spindle is arranged in the inner combustion tube on the side of the swirl generator that is subject to flow. The side of the swirl generator that is subject to flow is understood to mean the side which faces the chlorine gas supply. By means of the spindle, the swirl generator is fixed in the inner combustion tube and the chlorine gas flow is directed into the flow channels of the swirl generator, i.e. into the spaces between the guide vanes. The spindle can be constructed as one piece or from a plurality of parts. The length of the spindle is not limited.

The spindle diameter and core diameter are advantageously equal. This avoids additional turbulence when chlorine gas flows into the swirl generator. The diameter of the outer combustion tube advantageously narrows toward the combustion chamber. As a result, the speed of the hydrogen gas is increased, which leads to improved mixing of hydrogen gas and chlorine gas, as a result of which the conversion is increased and thus the free chlorine content in the product is reduced.

In a further advantageous embodiment, the swirl generator is recessed in the inner combustion tube to a maximum of double the outer diameter of the swirl generator. This means that the swirl generator does not close off flush with the inner and outer combustion tubes on the burning device outlet, but is instead recessed toward the gas supply.

The ratio of the recessed depth to the inner diameter of the inner combustion tube is preferably 1:1. The swirl generator being recessed leads to the swirled chlorine gas flow being guided in a short tube section, before the chlorine gas flow spreads at the burning device outlet. As a result, the spread of the jet can be decreased and the temperature load on the combustion chamber wall can thus be reduced. Moreover, the swirl generator being recessed achieves consistent mixing of hydrogen gas and chlorine gas, as a result of which the conversion is increased and thus the free chlorine content in the product is reduced. Moreover, the reaction zone is distributed over the total cross section of the combustion chamber and the temperature of the combustion chamber wall is lowered.

The further the swirl generator is recessed, the smaller the swirl at the burner outlet. If the recessed depth is more than double the outer diameter of the swirl generator, the swirl dissipates and the swirl generator does not cause improved mixing of hydrogen gas and chlorine gas.

BRIEF DESCRIPTION OF THE DRAWING

In the following, purely by way of example, the present invention is described by way of advantageous embodiments and with reference to the accompanying drawings. The invention is not limited by the figures.

FIG. 4a shows a swirl generator FIG. 4b is a plan view of a swirl generator

DETAILED DESCRIPTION OF THE DRAWING

Figure 1:
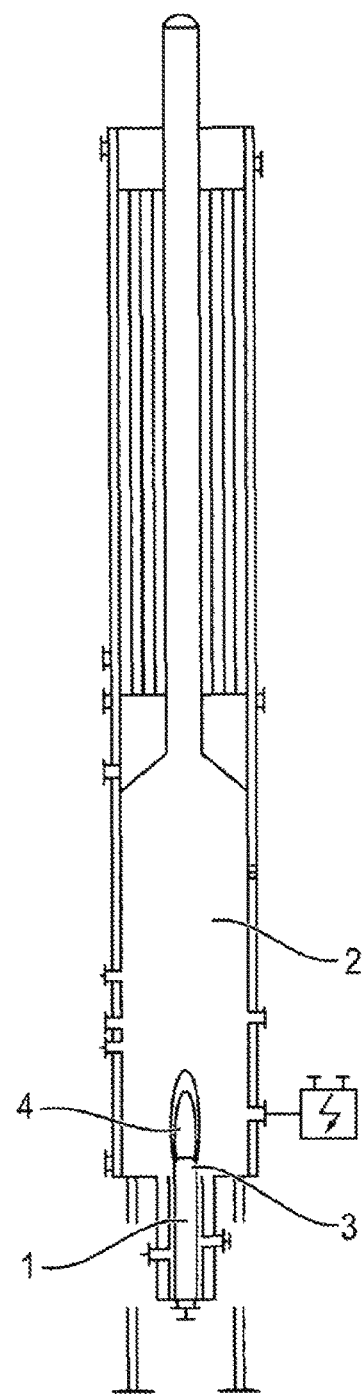
FIG. 1 is a cross-sectional view of a part of the hydrogen halide synthesis unit

FIG. 1 is a cross-sectional view of a part of the hydrogen halide synthesis unit. The gases are supplied to the combustion chamber (2) by means of the burning device (1). The gases are discharged out of the burning device at the burner outlet (3). In the combustion chamber (2), the supplied gases react by burning and form a flame (4).

Figure 2:
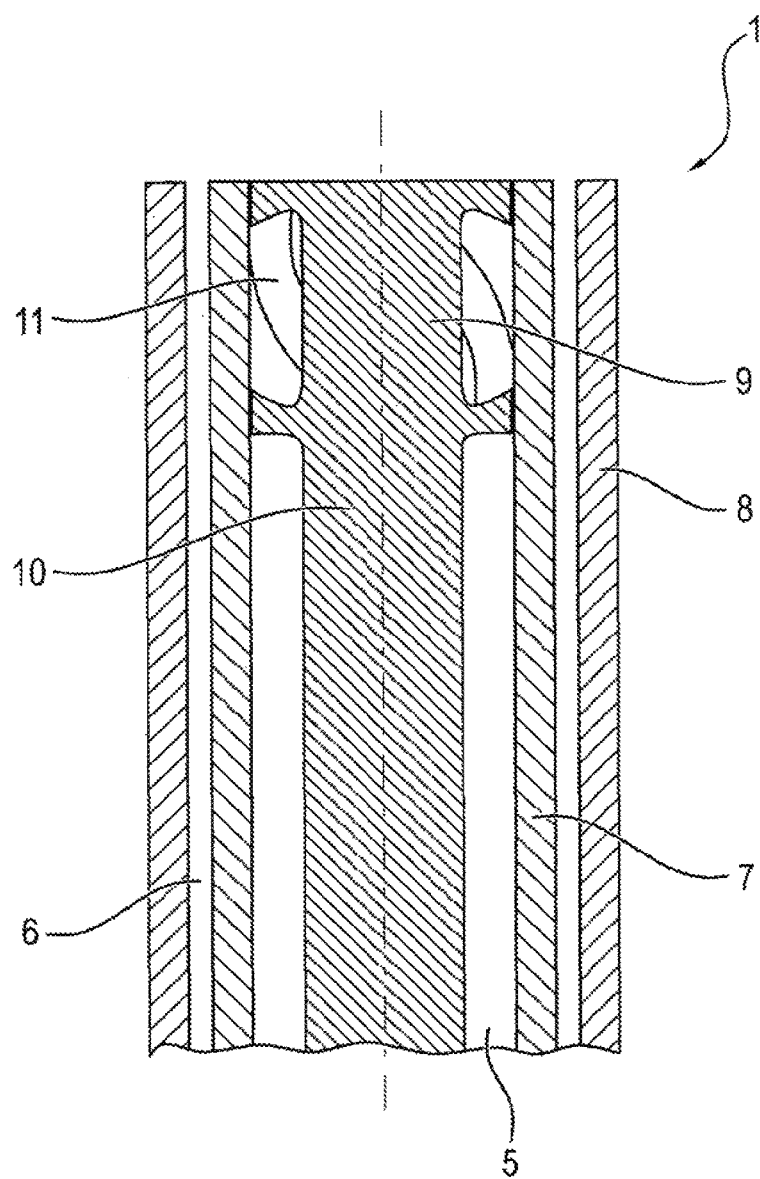
FIG. 2 is a cross-sectional view of a burning device

FIG. 2 shows a burning device (1) comprising two concentrically arranged combustion tubes, namely the inner combustion tube (7) and the outer combustion tube (8). A swirl generator (9) is arranged in the inner combustion tube (7), said swirl generator being attached via a spindle (10). The hydrogen gas is transported over the gap between the inner and outer combustion tubes, the hydrogen gas being supplied to the burner via the supply (6). The chlorine gas is supplied to the inner combustion tube via (5).

Figure 3:
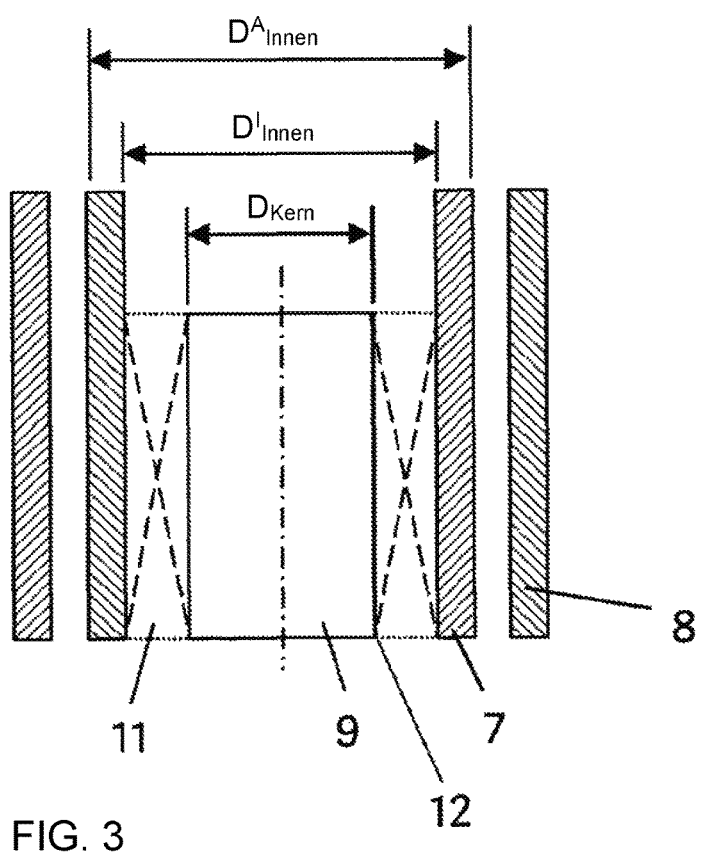
FIG. 3 is a cross-sectional view of a detail from the upper region of the burning device

FIG. 3 is a cross-sectional view of a detail from the upper region of the burning device (1) comprising two concentrically arranged combustion tubes, namely the inner combustion tube (7) and the outer combustion tube (8). The inner combustion tube (7) has an inner diameter $D^I_{Innen}$ an outer diameter $D^A_{Innen}$. The swirl generator (12) is located in the inner combustion tube (7). The swirl generator (12) comprises guide vanes (11) and a core (9), the core of the swirl generator having a diameter of $D_{Kern}$. The swirl generator (9) is recessed, since it does not close off with the inner combustion tube (7) and outer combustion tube (8) at the burner outlet.

FIG. 4a shows a swirl generator (12). The swirl generator (12) comprises guide vanes (11), said guide vanes having an average angle of incidence y.

FIG. 4b is a plan view of a swirl generator (12), the swirl generator (12) having guide vanes (11), a core (9) and an outer diameter (14). The free cross-sectional area (15), through which the chlorine gas flows, is between the guide vanes (11).

Figure 5:
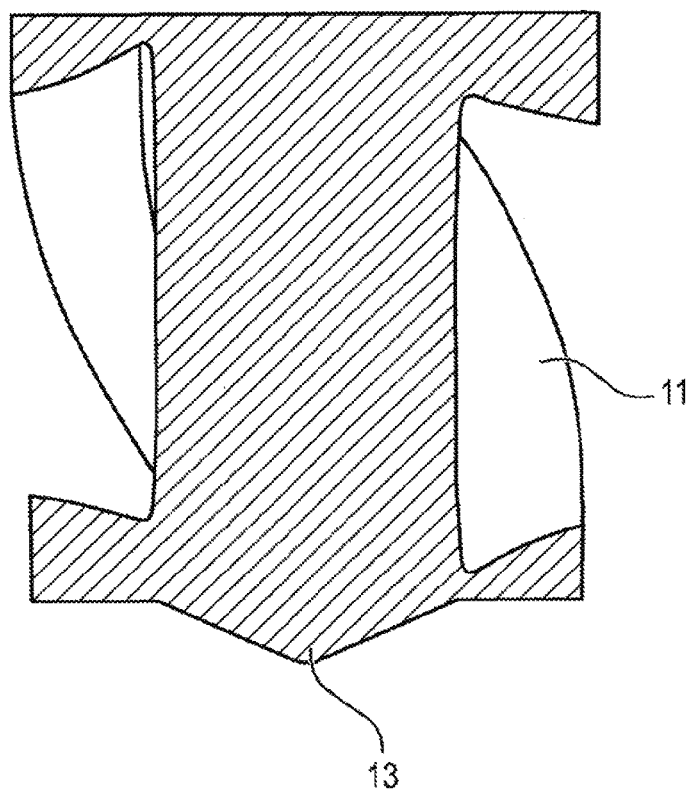
FIG. 5 is a cross-sectional view of a swirl generator comprising a spindle

FIG. 5 is a cross-sectional view of the swirl generator (12), the swirl generator comprising a spindle (13).

In the following, the present invention is described by way of embodiments, wherein the embodiments do not restrict the invention.

Embodiment 1

An outer combustion tube (8) and an inner combustion tube (7) made of graphite are provided. The two tubes have a length of 40 cm. The outer combustion tube (8) has an outer diameter of 18 cm. The inner combustion tube (7) has a diameter ($D^A_{Innen}$) of 12 cm. A swirl generator (9) made of graphite is inserted in the inner combustion tube (7). The swirl generator (9) has a length of 14 cm, the guide vanes having an average angle of incidence y of 60°. The free cross-sectional area is 25%. The core of the swirl generator has a diameter of 5 cm. The swirl generator closes off flush with the inner combustion tube (7) and outer combustion tube (8) and is glued into the inner combustion tube (7).

Embodiment 2

An outer combustion tube (8) and an inner combustion tube (7) made of graphite are provided. The two tubes have a length of 40 cm. The outer combustion tube (8) has a diameter of 18 cm. The inner combustion tube (7) has a diameter of 12 cm. A swirl generator (9) made of graphite is inserted in the inner combustion tube (7). The swirl generator (9) has a length of 14 cm, the guide vanes having an angle of incidence y of 60°. The free cross-sectional area is 40%. The core of the swirl generator has a diameter of 5 cm. The swirl generator is recessed in the inner combustion tube (7) by 2.5 cm and is glued into the inner combustion tube (7).

The invention claimed is:

1. A burning device for producing hydrogen halide, comprising at least two concentrically arranged combustion tubes, wherein a swirl generator is arranged in an inner combustion tube, wherein the swirl generator has an outer diameter of at least 30 mm.

2. The burning device according to claim 1, wherein the outer combustion tube, the inner combustion tube and the swirl generator comprise corrosion-resistant material, preferably selected from the group consisting of graphite, synthetic graphite, graphite impregnated with synthetic resin, preferably graphite impregnated with phenolic resin, silicon carbide, graphite coated with silicon carbide, silica glass, aluminum oxide or any mixtures thereof.

3. The burning device according to claim 1, wherein the swirl generator is from 0.5 to 2 times the length.

4. The burning device according to claim 1, wherein the swirl generator has the outer diameter from 30 mm to 300 mm.

5. The burning device according to claim 1, wherein the ratio of a core diameter to an outer diameter of the swirl generator is from 1:2.5 to 1:1.5.

6. The burning device according to claim 1, wherein the swirl generator has at least two guide vanes.

7. The burning device according to claim 6, wherein a free cross-sectional area, based on a total cross-sectional area of the swirl generator that is subject to flow, is from 15 to 75%.

8. The burning device according to claim 6, wherein the guide vanes extend in a spiral shape along a longitudinal axis of the swirl generator.

9. The burning device according to claim 6, wherein the guide vanes have an average angle of incidence of from 35° to 85°.

10. The burning device according to claim 1, wherein a supplied gas is discharged axially out of the outer combustion tube.

11. The burning device according to claim 1, wherein the inner combustion tube and the outer combustion tube are closed off at the same height.

12. The burning device according to claim 1, wherein a spindle is arranged in the inner combustion tube on a side of the swirl generator that is subject to flow.

13. The burning device according to claim 12, wherein the spindle diameter and core diameter are equal.

14. The burning device according to claim 2, wherein the diameter of the outer combustion tube narrows toward the combustion chamber.

15. The burning device according to claim 1, wherein the swirl generator is recessed in the inner combustion tube by up to two times the outer diameter of the swirl generator.

* * * * *